United States Patent
Ulrich

[11] 3,905,676
[45] Sept. 16, 1975

[54] COUPLING DEVICE FOR OPTICAL WAVEGUIDE

[75] Inventor: Reinhard Ulrich, Leonberg-Silberberg, Germany

[73] Assignee: Max-Planck-Gesellschaft zur Forderung der Wissenschaften e.V., Bursenstrasse, Germany

[22] Filed: Oct. 16, 1973

[21] Appl. No.: 406,810

[30] Foreign Application Priority Data
Nov. 28, 1972 Germany............................ 2258215

[52] U.S. Cl........ 350/96 C; 350/96 WG; 350/162 R
[51] Int. Cl. ............................................. G02b 5/14
[58] Field of Search ...................... 350/96 WG, 96 C

[56] References Cited
UNITED STATES PATENTS

| | | | |
|---|---|---|---|
| 3,387,909 | 6/1968 | Anderson et al.................. | 350/96 C |
| 3,420,596 | 1/1969 | Osterberg.............. | 350/96 WG UX |
| 3,586,872 | 6/1971 | Tien.......................... | 350/96 WG X |
| 3,791,715 | 2/1974 | Lean et al..................... | 350/96 WG |
| 3,803,511 | 4/1974 | Thompson................. | 350/96 C UX |

OTHER PUBLICATIONS

Harris et al., "Theory and Design of Periodic Couplers," Applied Optics, Vol. 11, No. 10, October, 1972, pp. 2234–2241.

*Primary Examiner*—John K. Corbin
*Attorney, Agent, or Firm*—Jerry Cohen; Charles Hieken

[57] ABSTRACT

An optical coupling system comprises a prism or diffraction grating coupling element in combination with a film waveguide or the like affording high selectivity and high coupling coefficient. A prism when used has a coated, partially reflective and interference inducing face arranged parallel to the film waveguide along a coupling interval wavelength of the latter. The coated face coating includes a partially transparent mirror layer and an interference film. When a grating coupling element is used, multiple interfering beams ordinarily produced are reduced to one output beam per diffraction order. Light beams may be propagated on one or both sides of the film.

23 Claims, 7 Drawing Figures

COUPLING DEVICE FOR OPTICAL WAVEGUIDE

BACKGROUND OF THE INVENTION

The invention relates to a selective optical coupler for the input or output coupling of at least one freely propagating light beam into or out of an optical film waveguide along a coupling interval. Such couplers are used in integrated optics where the film waveguides form parts of optical or electro-optical circuits, for example. Thus, the coupler has a role similar to that of an antenna in microwave technology.

Couplers of the described type are known in several embodiments, e.g. as prism-film couplers, as grating-film couplers and as so-called "tapered film" couplers. If necessary for input coupling into a narrow strip-like optical film waveguide, in certain embodiments they can be gradually broadened at constant thickness up to the width of the light beam coupled into the film waveguide. Such transitions are known as "tapered transitions" in microwave technology.

It is also known to construct the known couplers selectively by inserting a filter in their beam path. Here, for example, all light guided into the film waveguide is first coupled out and the light whose wavelength lies in a stop band lying outside a pass band is then absorbed by the filter or scattered in other directions. The filter increases the construction cost and light losses which lead to a low efficiency and can make a cooling system necessary.

Finally, it is also known to construct the prism-film coupler so that it has an especially large frequency or wavelength pass range for the light to be transmitted. The mentioned features result in significant expense. In particular, all light-guiding parts of the coupler must ge made of materials that have a fully determined dispersion of the refractive index

SUMMARY OF THE INVENTION

The principal object of the invention is to build a selective optical coupler with low effort in such a manner that it has a high efficiency with a not too large coupler length.

The problem is solved according to the invention by constructing a coupler of the initially mentioned type in which along the coupling interval parallel to the film waveguide there is a reflector device which reflects back into the film waveguide a portion of the total light emerging from the film waveguide.

In the coupler according to the invention, interferences that influence the coupling process are formed between the film waveguide and the reflector device. The interferences lead on one hand to a reinforcement of light waves having a pass wavelength $\lambda_o$, whereby this light is coupled in or out with a high coupling coefficient, and on the other hand to the extinction of input- or output-coupled light waves having a stop wavelength $\lambda_1$ lying outside the transmission range. The pass range about the pass wavelength $\lambda_o$ can have a very small width here.

When using the coupler according to the invention as an output coupler, incident light of pass wavelength $\lambda_o$ guided into the film waveguide is coupled out with a high coupling coefficient in the form of a well-focussed and directed beam. In contrast, light of wavelength $\lambda_1$ which lies outside the transmission band is not coupled out, but rather remains in the film waveguide and leaves it at its opposite end as a guided wave with practically no loss. The last-mentioned characteristic distinguishes an output coupler according to the invention from the known selective coupler which consists of an ordinary output coupler with a filter inserted at the output, wherein the light whose wavelength lies in the stop band outside the pass band is no longer available as a guided wave at the end of the coupling interval.

Because of the reciprocity principle, the coupler according to the invention can also be used to couple a freely propagating light beam of pass wavelength $\lambda_o$ into the film waveguide with high efficiency, but not light of wavelength $\lambda_1$ lying in the stop band, which leaves the coupler again as a freely propagating light beam with practically no loss.

The coupler according to the invention can also be used advantageously in applications in which a wavelength selectivity is not necessary, e.g. because monochromatic light is used, but in which a high coupling coefficient is desired in order to keep the overall length of the coupler short or in order to not let the angular aperture of the output coupled beam become too small.

Finally, the coupler according to the invention can also be built as an acousto-optical, electro-optical or nonlinear-optical output or input coupler.

As stated above, the method of operation of the coupler according to the invention is based on the interference phenomena produced in it. We can distinguish here between instances of an interference of an output beam of the film waveguide with itself and an interference between two different output beams of the film waveguide. The second instance is important in the grating-film coupler, which generally has several output beams.

BRIEF DESCRIPTION OF THE DRAWINGS

The invention is explained in the following by a drawing in which embodiments are illustrated. For the sake of simplicity, the couplers are always considered here in their use as output couplers from a film waveguide. Their properties as input couplers follow therefrom on the basis of reciprocity relations. Shown are.

DETAILED DESCRIPTION OF PREFERRED EMBODIMENTS

Figure 1:
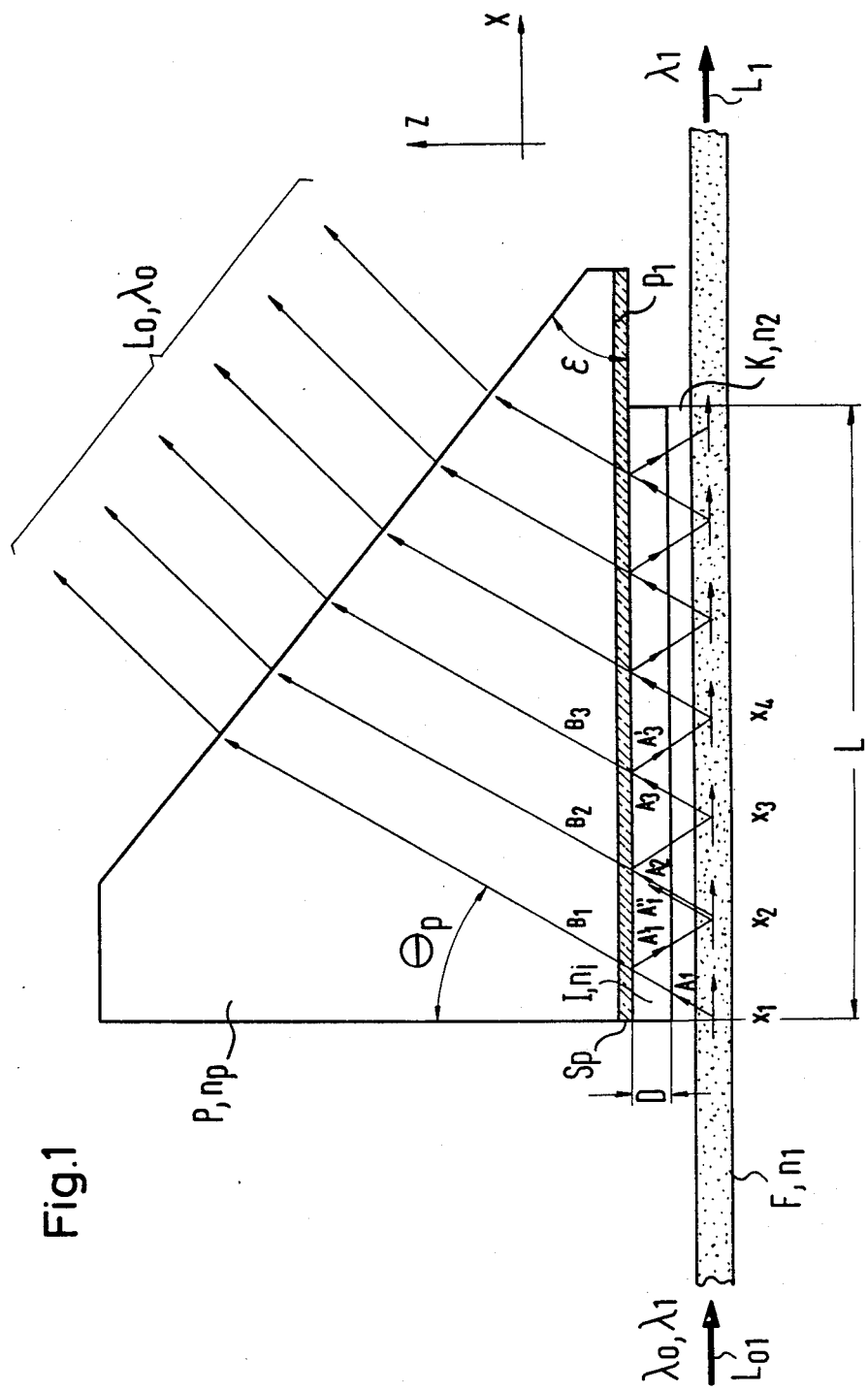
FIG. 1 is a prism-film coupler according to the invention.

FIG. 1 shows a prism-film coupler which in a known manner has an optical film waveguide F with refractive index $n_1$ and a prism P with refractive index $n_p$, with one light-passing face $p_1$ of the prism running parallel to the film waveguide F. The film waveguide F is abbreviated in the following as the film. A guided light beam $L_{01}$ enters into the film F. At the exit end of the film F, the light that is not coupled out exits as a guided light beam $L_1$. The output-coupled light leaves the prism P as a freely propagating light beam $L_o$.

A partially transparent mirror Sp and an interference film I of thickness D are introduced between prism P and film F. In a preferred embodiment, the interference film I has the same refractive index $n_i$ as the prism ($n_i = n_p$), but different refractive indexes may also be used with the invention.

The method of operation of the coupler built in this manner shall be explained with the aid of the schematically drawn light rays. According to the theory of the ordinary prism-film coupler, an output ray $A_1$ of the incoming guided light beam $L_{01}$ is coupled out of the film F at the point $x_1$ and travels at the angle $\theta_p$ into the interference film I and into the prism P. At the mirror Sp, a portion of the first output ray $A_1$ is reflected back to the film F as a reflected ray $A_1'$. According to the law of reflection, the angle of incidence of the reflected ray $A_1'$ on the film F is likewise $\theta_p$ and the condition that the reflected ray $A_1'$ can be coupled back into the film F at the point $x_2$ is thus satisfied. But whether this actually happens depends on the phase difference between the reflected ray $A_1'$ and the additional output ray $A_2$ that is coupled out at the point $x_2$. It is appropriate to define this phase difference as that which results after renewed reflection of the reflected ray $A_1'$ at the film F, i.e. as the phase difference $\gamma$ between the rays $A_1''$ and $A_2$ in FIG. 1, since these two rays travel in the same direction:

$$\gamma = \text{phase of } A_1'' - \text{phase of } A_2 \quad (1)$$

The theory of the prism-film coupler, stated in the representation given by R. Ulrich (J. Opt. Soc. Am., vol. 50, 1970, p. 1337), shows that the output coupling of the output ray $A_2$ is reinforced if the phase difference $\gamma$ is an integral even multiple of $\pi$: $\gamma = 2q\pi$ with $q = 0, 1, 2, 3, \ldots$. In contrast, if the phase difference is an odd multiple of $\pi$, $\gamma = (2q + 1)\pi$, then the emission of the output ray $A_2$ is weakened. At the intermediate phase differences of $\gamma = (q + \frac{1}{2})\pi$, there is no influence.

The effect described here occurs at all points $x_2, x_3, x_4, \ldots$. The incident reflected ray is always the resultant of all rays coupled out at the preceding points, weighted in each instance by the corresponding number of reflections at the partially transparent mirror Sp. The output rays $B_1, B_2, B_3, \ldots$ passed by the mirror Sp are parallel to each other and likewise interfere. This interference is likewise determined by the phase difference $\gamma$.

It should be pointed out that the decomposition of the output beam coupled out of the film F into the output rays $A_1, A_2, A_3, \ldots$ is arbitrary and was undertaken only for the sake of simpler explanation. In fact, the output coupling occurs continuously along the entire length L of the coupling interval.

The phase difference $\gamma$ is needed first for a quantitative description of the interference effects. According to known rules it is $$\gamma(\lambda) = 4\pi(D/\lambda)(n_i^2 - N^2)^{1/2} + \phi_{Sp}(\lambda) + \phi_K(\lambda) \quad (2)$$

where $\pi$ is the vacuum wavelength of the light, D is the thickness of the interference film I, $n_i$ is the refractive index of the interference film I, N is the so-called effective index (normalized propagation constant in the X-direction) of the output light rays coupled out of the film F, such as the output ray $A_2$ for example, and $\phi_{Sp}$ and $\phi_K$ are the phases of the (partial) reflection at the mirror Sp and of the (total) reflection at the film F. For example, the effective index N can be on the order of magnitude of 1.5 for glass waveguides.

Since according to this the phase difference $\lambda$ depends on the wavelength $\lambda$, wavelengths $\lambda_o$ will be given for which $\gamma(\lambda_o) = 2q\pi$. According to the statements above, the coupling is especially strong for these wavelengths. A more detailed consideration shows that the coupling is increased by a factor $(1 + r)/(1 - r)$ relative to the known case without a mirror. Here $r^2$ is the power reflectance (usually abbreviated as reflectance) of the partially transparent mirror Sp and r is the amplitude reflectance obtained as the square root of the former. The attenuation constant $K^* = 1/l$ can serve as a measure for the coupling strength, where l is that distance in the X-direction (direction of the guided light beam $L_{01}$) in which the amplitude of the guided wave decreases by a factor of e [i.e. 2.71828 ...] due to the coupling. As an example it may be stated that with a mirror Sp of reflectance $r^2 = 0.81$ there occurs a 19-times stronger output coupling at the wavelengths $\lambda_o$.

Conversely, light waves with those wavelengths $\lambda_1$ for which the interference has a cancelling effect because the phase difference $\gamma(\lambda_1) = (2q + 1)\pi$ are coupled out more weakly in the presence of the mirror Sp. In comparison to the case without a mirror, their coupling strength is decreased by the same factor $(1 + r)/(1 - r)$ by which the coupling was reinforced at the wavelengths $\lambda_o$. In the above example of a mirror Sp with the reflectance $r^2 = 0.81$, the waves with wavelengths $\lambda_1$ would thus be coupled out 19 times more weakly than without the mirror.

For the intermediate wavelengths, the coupling strength $K^*(\lambda)$ can be calculated from the following relation:

$$K^*(\lambda) = K \, Re \left\{ \frac{1 + r \cdot \exp[i\gamma(\lambda)]}{1 - r \cdot \exp[i\gamma(\lambda)]} \right\} \quad (3).$$

Here, K is the coupling strength of the coupler without the mirror, i.e. in the conventional design, calculated for the case of a prism P with the refractive index $n_p = n_i$. Re means the real part of the complex function standing after it. The variation of $K^*(\lambda)$ with the wavelength $\lambda$ according to (3) occurs in terms of the Airy function which also plays a part in other interference phenomena.

Figure 2:
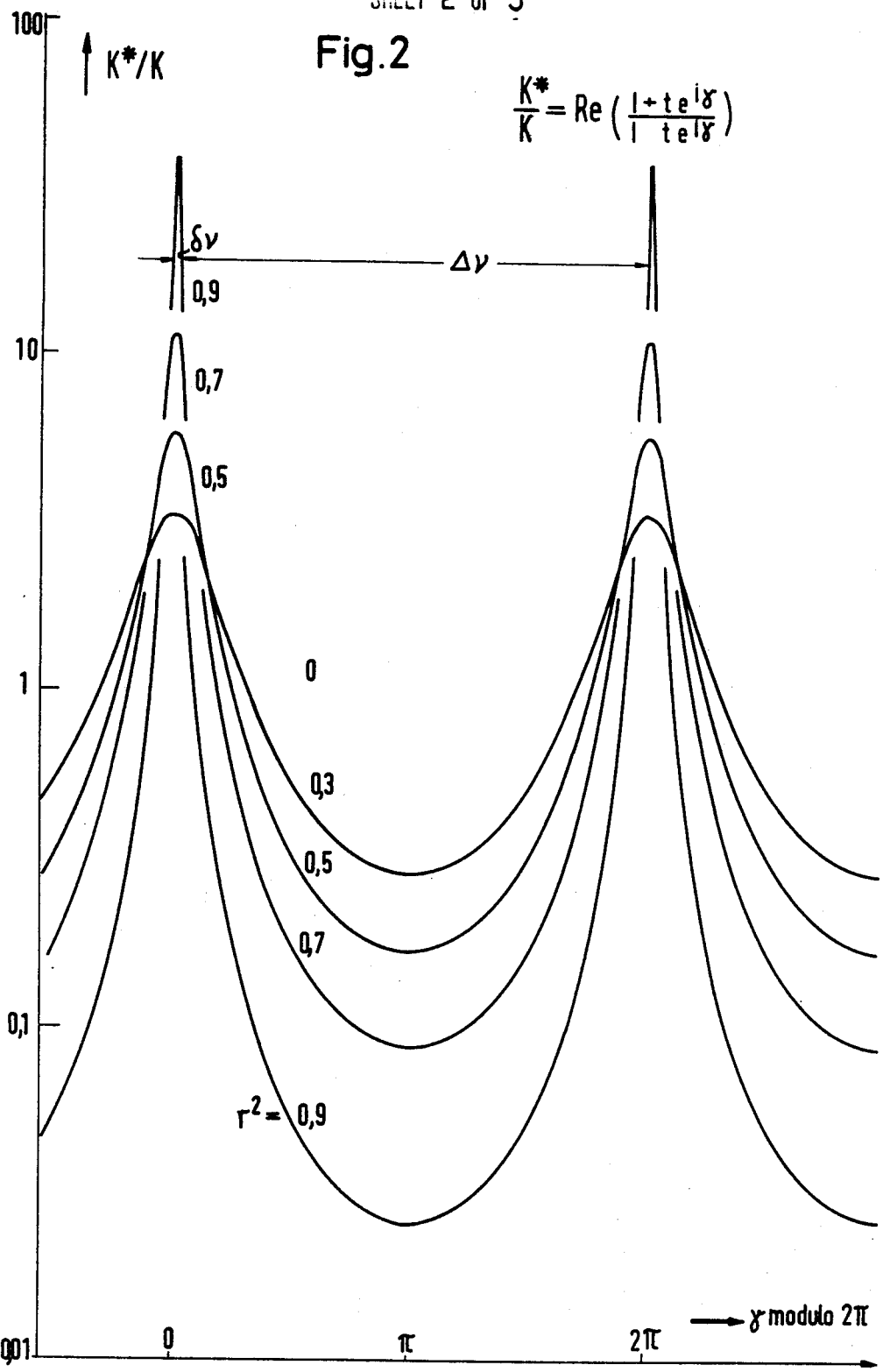
FIG. 2 a graph of the ratio of the coupling strength of the coupler according to FIG. 1 to the coupling strength of a prism-film coupler according to the state of the art, as a function of a phase difference occurring in the coupler according to FIG. 1.

FIG. 2 shows the ratio $K^*(\lambda)/K$ of the coupling strength with mirror Sp to the coupling strength without mirror, calculated from Equation (3), as a function of the phase difference $\lambda$ with the reflectance $r^2$ of the mirror Sp as parameter. The phase difference $\lambda$ plotted as abscissa according to Equation (2) is approximately proportional to the wave number $\nu = 1/\lambda$, so that the abscissa in FIG. 2 can equally well be considered as a section from a frequency scale. FIG. 2 makes evident the preferred coupling of those wavelengths for which the phase shift $\gamma = 2q\pi$. The selectivity of the coupling increases with increasing reflectance $r^2$. The ratio F =

$\Delta\nu/\sigma\nu$ can be used as a measure for the selectivity, where $\Delta\nu$ is the wave-number spacing of adjacent orders and $\sigma\nu$ is the full half-power width of the resonance. From Equation (3) one finds $$F = \pi \sqrt{r}/(1-r) \quad (4)$$

Because of the similarity of this expression to a corresponding one from the theory of the Fabry-Perot interferometer, the magnitude F can be designated as the "finesse" of the coupler. (Of course, it should be observed that in Equation (4) the value r of the amplitude reflectance appears, whereas in the theory of the Fabry-Perot interferometer the finesse is defined by means of the power reflectance $r^2$.) To illustrate Equation (4) it may be stated that with a reflectance $r^2 = 0.81$ the finesse is $F \approx 30$.

The wave-number spacing $\Delta\nu$ of adjacent orders follows from Equation (2) on the basis of the condition that such orders must differ by exactly $2\pi$ in the phase difference $\pi$:

$$\Delta\nu \approx \frac{1}{2 D (n_i^2 - N^2)^{1/2}} \quad (5).$$

Here, as previously in the calculation of the finesse F, the generally weak wavelength dependence of the reflection phase $\phi$ in Equation (2) has been neglected. According to Equation (5), the wave-number spacing $\Delta\nu$ is determined primarily by the thickness D of the interference film I and accordingly can easily be fixed concretely in the design of the coupler or can be adjusted subsequently. For example, with an interference film I made of zinc sulfide ZnS of refractive index $n_i = 2.35$ and a thickness of 2 $\mu$m [i.e. $2 \times 10$ Exp.($-6$) meters], a value $\Delta\sigma \approx 1400$ cm$^{-1}$ is obtained for the wave-number spacing of the orders, where N was set equal to 1.50. The corresponding spacing of the orders in the wavelength scale lies in the visible spectral range at $\Delta\lambda' \approx 40$–50 nm. The full half-power width $\sigma\nu$ of the preferably output-coupled spectral ranges is smaller than $\Delta\nu$ by the factor F. Thus, with the mentioned ZnS film as interference film I and with the mirror Sp of reflectance $r^2 = 0.81$, $\sigma \nu \approx 75$ cm$^{-1}$ corresponding to $\sigma\lambda \approx 2$ nm [i.e. $2 \times 10$ Exp. ($-9$) meters] in the visible.

Only the frequency dependence of the coupling strength $K^*(\lambda)$ has been described heretofore. But how strongly the coupler couples out an incoming guided wave also depends on the length L of the coupling interval. If $kK^*L \lesssim 1$, the incoming power is nearly completely coupled out. Here, $k = 2\pi/\lambda$.

For example, for $kK^*L = 2$ approximately 98% of the incident power is coupled out, while 2% remains in the film F and leaves it in the beam $L_1$. In contrast, if $kK^*L$ is very small compared to 1, then the major portion of the incoming power remains in the the film F and only a fraction on the order of magnitude $2kK^*L$ is coupled out. This yields a condition for the optimal length $L_{opt}$ of the coupling intervals. It should preferably be so long that the wavelengths $\lambda_o$ of the pass band can just be coupled out approximately completely:

$$L_{opt} \approx 1/kK^*(\lambda_o) \quad (6)$$

with $k = 2\pi/\lambda_o$. $kK^*L << 1$ for the wavelengths $\lambda_1$ of the stop band; they are coupled out very weakly. In the example with the reflectance $r^2 = 0.81$, $K^*(\lambda)$ varied by the factor $19^2 = 361$ between $\lambda_o$ and $\lambda_1$. Thus, if the length L is chosen according to Equation (6), then only the fraction $2kK^*(\lambda_1)L$ 0.011 is coupled out at the stop wavelength $\lambda_1$.

The most important characteristic of the partially transparent mirror Sp is its reflectance $r^2$, since via the finesse F it determines the half-power width $\sigma\nu$ of the pass bands of the coupler. Besides the reflectance $r^2$, the mirror Sp is also characterized by its transmittance t and its absorption a, where $t + a + r^2 = 1$. To prevent losses, the absorption a should be as small as possible. A more exact consideration shows that an approximate fraction $a/(a + t)$ of the light power actually coupled out from the film F is absorbed in the mirror Sp. For this reason, $a << t$ should hold in order that the output-coupled power also reaches fully into the prism P and then further into free space. It should further be noted that the mirror losses due to the absorption a are manifested only in an attenuation of the output-coupled beam $L_o$ of wavelength $\lambda_o$. In contrast, the beam $L_1$ of wavelength $\lambda_1$ remaining in the film F is influenced very little by losses in the mirror Sp, since the field of the guided wave is practically equal to zero at the position of the mirror Sp. In the simplest case, the mirror sp can be a thin metal film, e.g. of silver, whose thickness is so chosen that there is an acceptable compromise between high reflectance $r^2$ and low ratio of absorbed power $a/(a + t)$. The metal film can be vapor-deposited onto the light-passing face $P_1$ of the prism P.

Instead of a mirror formed from a metal film, a dielectric reflection device can also be used. In order to obtain a reflection it is already sufficient in principle to make the interference film I and the prism P from two materials having different refractive indices $n_i$, $n_p$. But higher reflectances $r^2$ are achievable in known manner by using several dielectric films of alternating high and low refractive index. Such a reflection device, which can be thought of as a combination of several specular surfaces, is substantially equivalent to a simple mirror in its operation. Of course, it usually has a pronounced phase-frequency characteristic $\phi_{Sp}(\lambda)$ which destroys the simple proportionality between the wave number $\lambda$ and the phase difference $\gamma$ that was assumed above. If desired, this can be exploited in order to produce special wavelength dependences of the coupling strength $k^*(\lambda)$.

The properties to be required of the interference film I are a sufficiently high refractive index $n_i$, a suitable and uniform thickness D and low optical losses. The refractive index $n_i$ should be larger than the effective index N of that mode of the light beam guided in the film F from which the light is to be coupled out. Only for $n_i > N$ can the output rays $A_1, A_2, A_3 \ldots$ of FIG. 1 be coupled out at all. The influence of the thickness $D$ of the interference film I on the wave-number spacing $\Delta\nu$ of adjacent orders has already been mentioned. If the thickness D is not uniform over the length L of the coupling interval, then the phase difference $\gamma$ and therewith the coupling strength $K^*$ varies along the coupling interval. This can affect the selectivity and the efficiency of the coupler, which generally is disadvantageous. However, in special applications where a reduction of the selectivity is desirable, the thickness D can be variable to a small degree along the coupling interval. Another condition for the thickness D is that it should be very much smaller than the length L of the coupling interval in order that the assumptions made here remain correct. Finally, it is also essential that the interference film I be made of an optically transparent material. Otherwise, the radiation of the pass wavelengths $\lambda_o$ to be coupled out is absorbed, since the interference film forms a resonator for them. $a_i' \ll 1 - r$ can be viewed as a practical upper limit for the permissible losses, where $a_i'$ is the absorption along the path of the output ray $A_1'$ in the interference film I. Since this path is approximately equal to the thickness D, the condition can also be formulated as $a_i \ll 1 - r$, where $a_i$ is the absorption along the path of a light ray passing perpendicularly through the thickness D of the interference film I.

Figure 3:
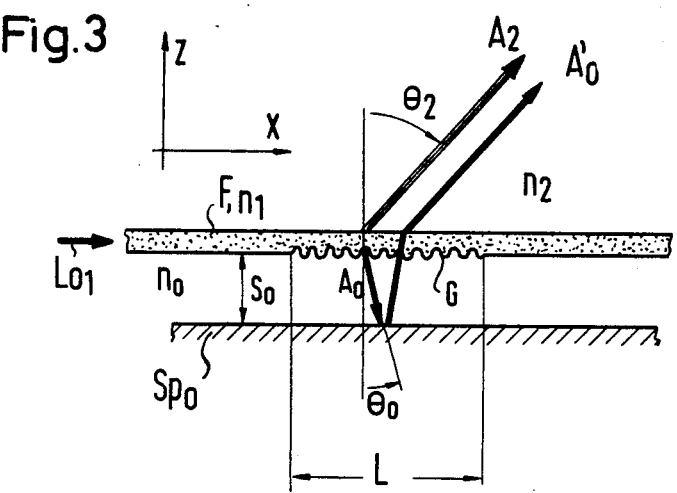
FIG. 3 is a grating-film coupler according to the invention.

FIG. 3 illustrates a coupler in the form of a grating-film coupler. In known manner, it has a film F of refractive index $n_1$ on whose bottom a grating G is formed by a multiplicity of transverse ruling grooves. The grating G extends in the X-direction of the film F over the coupling interval of length L.

The prism-film coupler in its usual form has only a single output beam when a guided light wave in a given mode is delivered to it. In contrast, the grating-film coupler generally produces several output beams. These correspond to the different diffraction orders of the grating G and they can be described by the equation $$N_m = N_o + m(\lambda/\Lambda) \tag{7}$$

wherein $N_m$ and $N_o$ are the effective indices (normalized propagation constants in the X-direction) of the $m^{th}$ diffraction order and of the incident guided light beam $L_{01}$, respectively, $\lambda$ is the vacuum wavelength of the light, $\Lambda$ is the grating constant of the grating G and $m = 0, \pm 1, \pm 2, \ldots$ is the order. for each diffraction order m there are then generally two different output beams which travel in the two materials of refractive indices $n_0$ and $n_2$ bordering on the film F. These two beams are denoted by $A_o$ and $A_2$ in FIG. 3. They make angles $\theta_0^{(m)}$ and $\theta_2^{(m)}$ with the film F (X-direction). The magnitudes of these angles are given by $$\theta_j^{(m)} = \arcsin(N_m/n_j) \tag{8}$$

where $j = 0$ and $j = 2$, respectively. The two beams $A_o$, $A_2$ have a fixed phase relation to each other. Therefore, they can be made to interfere as is illustrated schematically in FIG. 3. The beam $A_o$ coupled out into the medium of refractive index $n_o$ is reflected back to the grating G as beam $A_o'$ by a highly reflecting mirror $Sp_o$ and after traversing the film F enters into the medium of refractive index $n_2$. Since the beams $A_o$ and $A_2$ are of the same order of diffraction and therefore, have the same effective index $N_m$ which is preserved during the reflection at the mirror $Sp_o$, the beams $A'_o$ and $A_2$ travel parallel to each other. Whether they interfere with each other constructively or destructively depends on their phase difference as in the instance of FIG. 1.

The interference of the two beams $A_o'$, $A_2$ has two important effects. Firstly, there again arises a wavelength dependence of the coupling strength $K^*(\lambda)$. Secondly, for the pass wavelengths $\lambda_o$ with constructive interference the mirror $Sp_o$ raises the efficiency of the output coupling (and thus also of the input coupling) in the direction $\theta_2^{(m)}$ in comparison to the same grating-film coupler without mirror. The efficiency of the output coupling is understood here as the ratio that indicates what fraction of the incoming guided light power is coupled into a given output beam. Whereas this efficiency is practically 100% in the prism-film coupler with its single output beam, in the grating-film coupler the incoming power is distributed into all diffraction orders that are possible according to Equation (7), generally with two output beams in each order. Therefore, if special precautions are not taken, the efficiencies of the individual output beams of a grating-film coupler are generally far below 100%. The simplest way to raise this efficiency is first to reduce to one the number of orders possible according to Equation (7) by using a sufficiently fine grating G. A sufficient condition for this is $\Lambda < \lambda/N_o$. But in the known grating-film coupler there are then still the two output beams $A_o$, $A_2$ of the single remaining order $m = -1$, so that each of them has an efficiency of about 50%. For this coupling configuration which is comparatively simple to build from an engineering viewpoint, the design according to FIG. 3 now offers the possibility of raising the efficiency from about 50 to 100%. This is explained by the fact that a new coupler having a single output beam has arisen due to the spatially coherent superposition of the two original output beams $A_0$ and $A_2$. The raising of the efficiency exists independently of the value of the separation $S_o$ between film F and mirror $Sp_o$, but with the single condition that the separation $S_o$ and the amplitudes of the beams $A_o'$ and $A_2$ may not have just those values for which a total extinction of the beams $A_o'$ and $A_2$ occurs. But since the amplitudes of the beams $A_o'$ and $A_2$ are generally somewhat different, this extinction possibility is very improbable.

The coupling efficiency is also raised in the instance that several diffraction orders m exist simultaneously. Then, due to the presence of the mirror $Sp_o$, the totality of the output beams are lowered by approximately half, so that on the average approximately twice the output power falls to the individual beam. Namely, whereas without a mirror there are generally two output beams associated with each order m, with the mirror $Sp_o$ there is only a single output beam per order.

For the output coupling (and input coupling) of a specific wavelength, an efficiency of nearly 100% can be achieved also in the case of several simultaneously existing diffraction orders if the separation $S_o$ is chosen suitably. This can be explained by the fact that the different orders are coupled out with different effective indices, so that there is constructive interference with some of them and destructive interference with others. Therefore, by choosing $S_o$ cleverly it is possible to obtain destructive interference for all diffraction orders except one. The exceptional order is then the only one in which power can still be coupled out, so that its efficiency approaches 100%.

Besides the output coupling efficiency considered above, the coupling strength $K^*(\lambda)$ of the coupler according to FIG. 3 is also of interest. For the simplest case that only one diffraction order exists and that the two output beams $A_o'$, $A_2$ have equal amplitudes, the coupling strength is given by $$K^*(\lambda) = K\{1 + \cos[\gamma(\lambda)]\} \tag{9}$$

Here, $\gamma(\lambda)$ is the phase difference of the two output beams $A_2$ and $A_0'$, which as in Equation (2) depends on the separation $S_o$ and on the wavelength $\lambda$. The form of Equation (9) is typical of a two-beam interference. Therefore, the wavelength dependence of the coupling strength $K^*$ according to Equation (9) is also only weakly pronounced in comparison to the multibeam interference shown in FIG. 2. The practical significance of a coupler as in FIG. 3 accordingly is not so much its wavelength dependence as its increased efficiency which can be raised up to 100%.

Multiple interferences and the high selectivity associated therewith can be achieved also with the grating-film coupler if - possibly in addition to the highly reflecting mirror $Sp_o$ of FIG. 3 — a partially transparent reflection device is arranged along the coupling interval parallel to the film waveguide. A corresponding embodiment of a grating-film coupler is illustrated schematically in FIG. 4. The action of this coupler can be thought of as a combination of the methods of operation illustrated by FIGS. 1 and 3. Together with the highly reflecting mirror $Sp_o$, the film F provided with the grating G forms a coupler that produces only a single output beam, as was described in connection with FIG. 3. Into this output beam there is now brought the partially transparent mirror $Sp_2$ whose function corresponds to that of the mirror Sp in FIG. 1. However, the determining thickness of the interference film here is a combination of the thickness $S_o$ of the film between the grating G and the highly reflecting mirror $Sp_o$ and the thickness $S_2$ of the film between the grating G and the partially reflecting mirror $Sp_2$, wherein the values of the refractive indices $n_o$ and $n_2$ of these film also enter.

Figure 4:
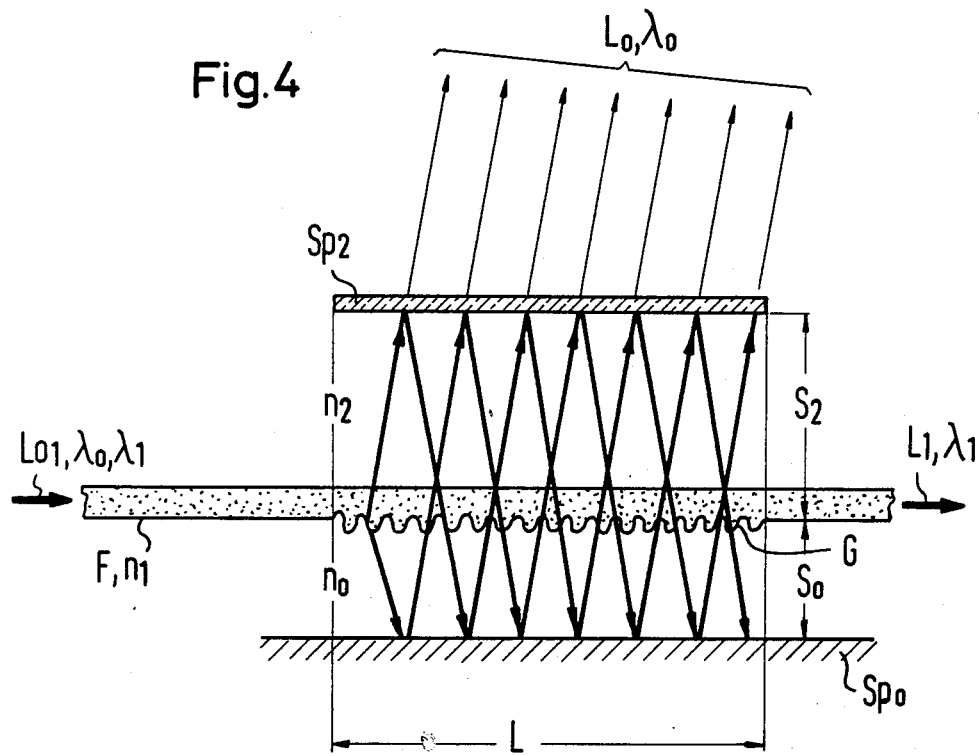
FIG. 4 a grating-film coupler according to the invention, improved further relative to the embodiment of FIG. 3.

It should be noted that besides the multiple interferences indicated in FIG. 4 between the mirrors $Sp_o$ and $Sp_2$, a role can also be played by reflections at the boundary surfaces between the film F, whose refractive index is $n_1$, and the adjacent films with refractive indices $n_o$ and $n_2$. This complicates an exact analysis of the coupler of FIG. 4. However, this analysis is possible by consistent application of the principles described in the preceding. If the reflections at the two boundary surfaces of the film F are negligibly small, if the mirror $Sp_o$ reflects totally, which is aspired to as much as possible in order to prevent losses, and if moreover $S_2 >> S_o$ holds, then the frequency dependence is again given by Equation (3), wherein the thickness $S_2$ occurs instead of the thickness D and $r^2$ denotes the reflectance of the mirror $Sp_2$.

All the considerations discussed above concerning the optimal length L of the coupling interval, the quality of the partially reflecting mirror $Sp_2$ and of the interference film, and the raising of the efficiency in the event of one or more existing diffraction orders apply to the coupler of FIG. 4.

The basic idea of influencing the output coupling process by reflecting back a portion of the output radiation and by exploiting the interferences that then occur can be generalized from the previously described, purely passive embodiments to couplers in which acusto-optical, electro-optical, nonlinear-optical or similar physical processes occur in or on optical film waveguides.

Figure 5:
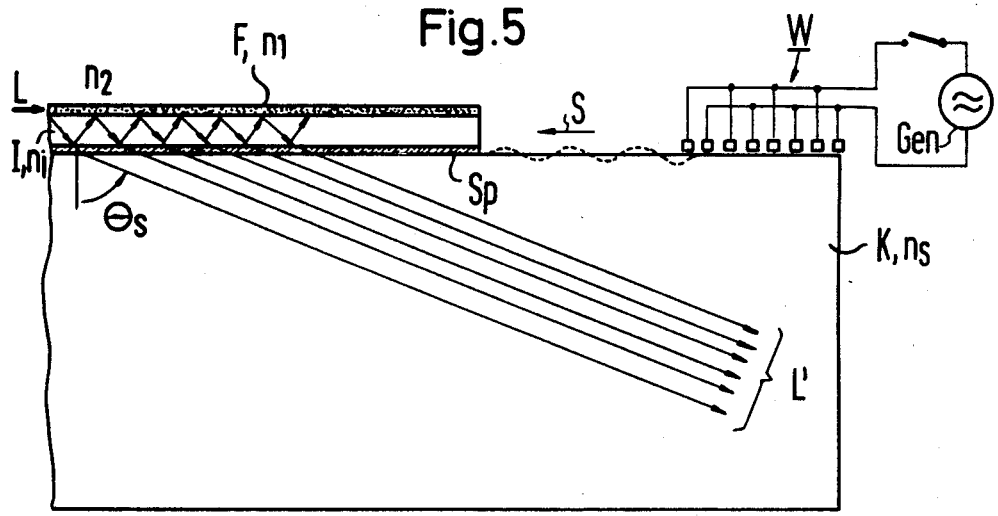
FIG. 5 a coupler according to the invention constructed as an acousto-optical modulator.

FIG. 5 shows schematically an acusto-optical modulator or deflector as was indicated in its basic form by W.S.C. Chang (IEEE Quantum Electronics, vol. QE-6, 1971, page 167). In this basic form, the modulator has a piezoelectric crystal K, for example, as substrate material on one of whose surfaces is located an optical film waveguide, the film F. The modulator also comprises a suitable electro-acoustical transducer W which is supplied by a high-frequency generator Gen and which generates an acoustic surface sound wave that propagates in the direction of the arrow S. The spatially periodic stress field associated with this sound wave now acts on the incident guided light wave L in the same way as the grating of a grating-film coupler: The light wave L is coupled out from the film F and travels as a light beam L' at an angle $\theta_s = \arcsin(N_0/n_s - \lambda/n_s\Lambda)$ into the crystal K. Here, $N_o$ is the effective index (normalized propagation constant in the X-direction) of the light wave L, $n_s$ is the refractive index of the crystal K, $\lambda$ is the vacuum wavelength of the lightwave L and $\Lambda$ is the wavelength of the acoustic surface wave. The output coupling from the film F can be modulated or switched by switching on and off the high-frequency source supplying the transducer W. As long As $N_o - \lambda/\Lambda > n_2$, there is only the single illustrated bundle of output radiation which forms the light beam L'. Here, $n_2$ is the refractive index of the medium situated above the film F in FIG. 5. For example, it can be that $n_2 = 1$.

The coupling strength achievable under realistic conditions with the known coupler is very low. However, according to the invention, an interference film I of refractive index $n_i$ and a partially transparent mirror Sp are now installed between the film F and the crystal K. The mirror Sp can be applied directly to the surface of the crystal K that faces toward the film F. The coupling strength thereby can be improved decisively, at least for the narrow wavelength bands that correspond to the maxima of the curves in FIG. 2. The length of the coupling interval required for that purpose is also shortened decisively. Since the entire light wave L is coupled out in the light beam L', the efficiency of the output coupler reaches 100% under the assumption that the coupling interval is large enough and that no losses occur. The interference film I must have a refractive index $n_i$ which is lower than the refractive index $n_1$ of the film F. Equation (3) and the wavelength dependence according to FIG. 2 as well as Equation (6) are again valid.

The fact that the mirror Sp and the interference film I in the modulator of FIG. 5 are also exposed to the sound-wave field should have only a small effect.

Figure 6:
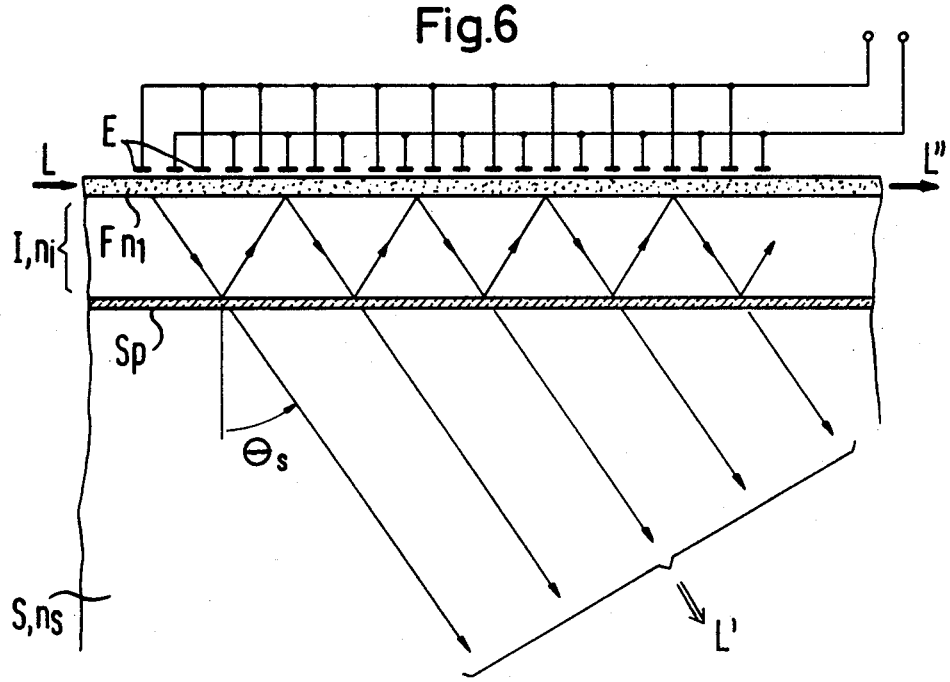
FIG. 6 a coupler according to the invention constructed as an electro-optical modulator.

An electro-optical modulator as a refinement of a coupler according to the invention is shown in FIG. 6. Here, a multiplicity of strip-like electrodes E, which can be charged alternately positively or negatively by connection to a modulation voltage, is located a slight distance above the film F, which can be made of electro-optically active material. Due to the linear or quadratic electro-optical effect, the resulting electric fields generate changes of the optical refractive index in the film F and/or in the adjoining material. The resulting "grating" of the refractive index changes again induces an output coupling. The incident guided light beam L can thereby be coupled out more or less strongly as a freely propagating light beam L' which travels at an angle $\theta_s$ into the substrate S which has a refractive index $n_s$. The light that is not coupled out leaves the film F as a guided light beam L''.

In turn, the efficiency of the output coupling is raised advantageously in the modulator by means of an interference film I lying between the film F and the substrate S and a partially transparent mirror Sp, just as was the case in the modulator according to FIG. 5. Besides the film F, the interference film I can also be made of an electro-optically active material in order to raise the modulation efficiency.

Figure 7:
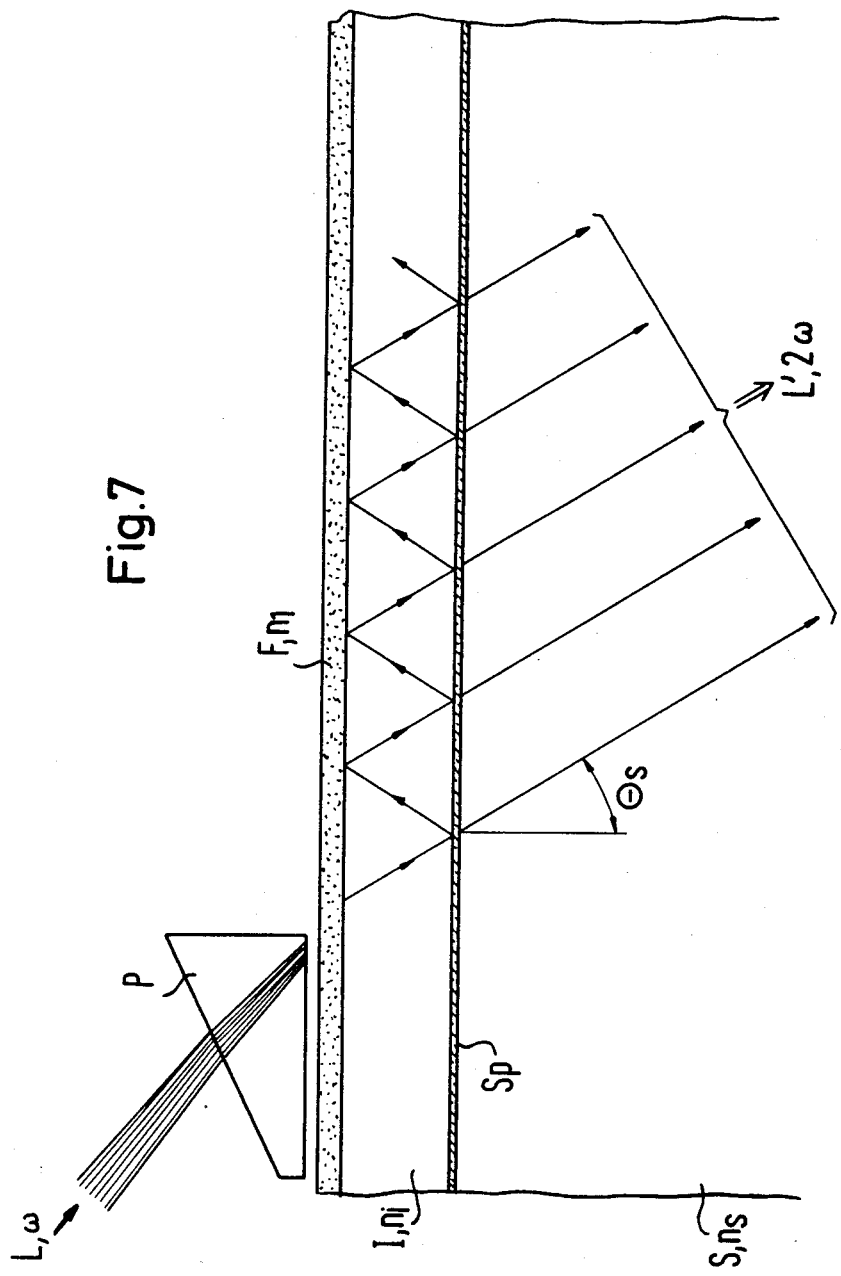
FIG. 7 a nonlinear optical coupler to generate the second harmonic according to the invention.

FIG. 7 illustrates the application of the coupler according to the invention as a nonlinear optical device for frequency doubling. In its basic constructional form with a prism P to couple in a coherent light beam L of angular frequency $\omega$, a film F and a substrate S, this arrangement has been used previously to generate the second harmonic of angular frequency $2\omega$ in the beam L' coupled out from the film F, with an Nd-YAG laser having been used as light source for the light beam L. In the device, a polarization wave travelling in the film F or in the adjoining substrate S is coupled to the wave propagating freely as a beam L' in the substrate S. An interference film I and a partially transparent mirror Sp are provided here also between the film F and the substrate S. As in the instances considered previously, these bring about an efficiency improvement which with correct tuning can amount to several orders of magnitude. The condition for formation of the second harmonic is $$n_i(\omega) < (N(\omega) < n_i(2\omega)$$

where $n_i$ is the refractive index of the interference film I and N is the effective index of the wave guided in the film F. In addition, the film F and/or the interference film I must have nonlinear optical properties in order to generate the second harmonic.

In all embodiments, the film waveguide (film F) preferably has a width on the order of magnitude of a few light wavelengths measured in the plane of the film and perpendicular to the direction of propagation of the guided light waves.

It is evident that those skilled in the art, once given the benefit of the foregoing disclosure, may now make numerous other uses and modifications of, and departures from the specific embodiments described herein without departing from the inventive concepts. Consequently, the invention is to be construed as embracing each and every novel feature and novel combination of features present in, or possessed by, the apparatus and techniques herein disclosed and limited solely by the scope and spirit of the appended claims.

What is claimed is:

1. Selective optical coupler for coupling at least one optical beam propagating freely in an optical medium with at least one optical wave propagating and guided in a dielectric film comprising, an interference layer, means for nonselectively coupling an optical beam along a coupling interval into or from said dielectric film through one surface of said dielectric film from or into said interference layer said layer selecting at least one optical beam by multiple reflections between its two boundaries, and a partially transparent reflector on one side of said layer through which at least said selected optical beam propagating in said interference layer is coupled with the freely propagating optical beam.

2. Selective optical coupler according to claim 1 wherein the thickness D of said interference layer is uniform over the coupling interval and is chosen so that $$4\pi n_i(D/\lambda)\cos\theta_i + \phi_{Sp}(\lambda) + \phi_k(\lambda)$$

is equal to an even multiple of $\pi$ for the wavelength $\lambda=\lambda_o$ of said selected optical beam and equal to an odd multiple of $\pi$ for the wavelength $\lambda_1$ of a nonselected optical beam where $\theta_i$ is the angle between the direction of the optical beam propagating freely in said interference layer and said surface of said dielectric film, $\phi_{Sp}(\lambda)$ is the reflection phase of said partially transparent reflector for a light beam incident on it at an angle $\theta_i$ from said interference layer, and $\phi_K(\lambda)$ is the reflection phase of said means for nonselective coupling for a light beam incident on it at an angle $\theta_i$ from said interference layer.

3. Selective coupler according to claim 2 wherein said means for non-selective coupling is a transparent layer having an index of refraction different from the index of refraction of said interference layer.

4. Selective coupler according to claim 2 wherein said means for nonselective coupling is a grating on a surface of said dielectric film.

5. Selective coupler according to claim 4 wherein said grating comprises means for establishing coupling between an optical wave propagating in said dielectric film and one single freely propagating optical beam in said interference layer.

6. Selective coupler according to claim 4 wherein a highly reflecting reflector device is arranged parallel to said dielectric film on its side opposite to said semitransparent reflector.

7. Selective coupler according to claim 1 wherein the absorption $a$ of said partially transparent reflector is smaller than its transmittance $t$ for said selected optical beam.

8. Selective coupler according to claim 7 wherein said interference layer and said optical medium are contiguous along their surfaces facing each other and wherein said interference layer and said optical medium have different indices of refraction so that said partially transparent reflector is formed by the step in said indices of refraction at the common interface of said interference layer and said optical medium.

9. Selective coupler according to claim 7 wherein said partially transparent reflector is a single dielectric film having an index of refraction smaller than the indices of refraction of said interference layer and of said optical medium.

10. Selective coupler according to claim 7 wherein said partially transparent reflector has at least one boundary surface between films of alternately high and low refractive indices.

11. Selective coupler according to claim 1 wherein said partially transparent reflector is a thin metallic layer.

12. Selective coupler according to claim 1 wherein the power reflectance $|r|^2$ of said partially transparent reflector has at least approximately the value of $|r|^2 = 0.8$.

13. Selective coupler according to claim 1 wherein the length of said partially transparent reflector, measured along the direction of propagation of said optical wave traveling in said dielectric film, is at least equal to the length L of said coupling interval.

14. Selective coupler according to claim 13 wherein the length L of said coupling interval is chosen so that the intensity of a selected optical wave propagating in said dielectric film decreases to a fraction of at least approximately 0.02 due to the selective output coupling over the length L.

15. Selective coupler according to claim 1 wherein said optical medium has an optical surface positioned and inclined with respect to its optical surface facing the interference layer, such that said optical beam propagating freely in it can emerge from said optical medium into free space without suffering total internal reflection.

16. Selective coupler according to claim 1 designed as an acousto-optical modulator with said partial reflector, said interference layer, and said dielectric film arranged on a surface of a substrate constituting said optical medium wherein said dielectric film is influenced by an acoustic surface wave propagating along a surface of said substrate.

17. Selective coupler according to claim 1 comprising an electro-optical modulator with said partially transparent reflector, said interference layer and said dielectric film arranged on a surface of a substrate constituting said optical medium,
and further comprising electrodes coupled to said dielectric film for producing an electrical field in said dielectric film varying along said coupling interval.

18. Coupler according to claim 17 wherein said optical medium is made of an electro-optically active material.

19. Coupler according to claim 18 wherein the index of refraction $n_i$ of said optical medium is smaller than the index of refraction $n_1$ of said dielectric film.

20. Coupler according to claim 1 for generating an optical radiation at a frequency $\omega_3 = \omega_1 \pm \omega_2$ by mixing two optical waves of frequencies $\omega_1$ and $\omega_2$ propagating in said dielectric film wherein the means for nonselective coupling are provided by nonlinear optical properties of said dielectric film and generated radiation occurs in the form of the freely propagating beam.

21. Coupler according to claim 20 wherein $\omega_3 = 2\omega_1$ and wherein the refraction index $n_i$ of said optical medium satisfies the inequality $$n_i(\omega_1) < N(\omega_1) < n_i(\omega_3)$$

where $\omega_1$ is the frequency and N the effective index of refraction of said optical wave propagating in said dielectric film.

22. Selective coupler according to claim 1 wherein the width of said dielectric film is in the order of magnitude of a few wavelengths measured in the plane of said dielectric film and perpendicular to the direction of propagation of said guided optical wave propagating in said dielectric film.

23. Selective coupler according to claim 1 wherein said interference layer has the form of a film deposited onto the partially transparent reflector.

* * * * *